Nov. 4, 1930.                A. MOORHOUSE                 1,780,270
                              MOTOR VEHICLE
                       Filed Oct. 28, 1925        2 Sheets-Sheet 1
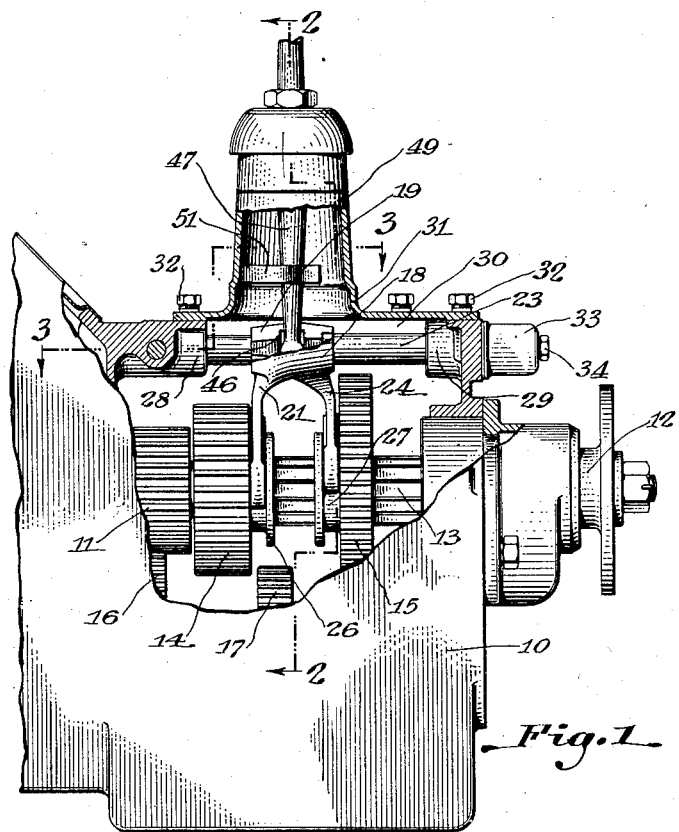
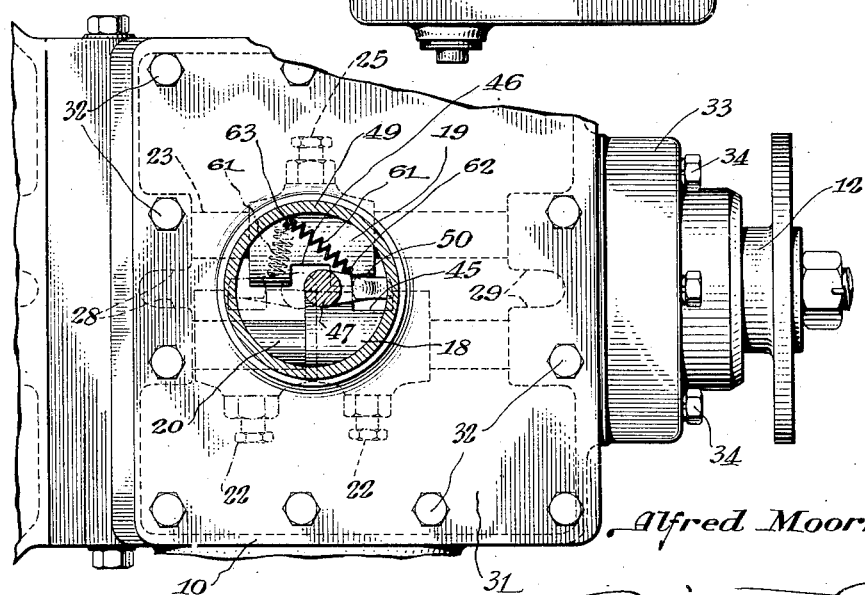
Inventor
Alfred Moorhouse Nov. 4, 1930.   A. MOORHOUSE   1,780,270
MOTOR VEHICLE
Filed Oct. 28, 1925   2 Sheets-Sheet 2

Inventor
Alfred Moorhouse
By
Attorney

Patented Nov. 4, 1930

1,780,270

UNITED STATES PATENT OFFICE

ALFRED MOORHOUSE, OF DETROIT, MICHIGAN, ASSIGNOR TO PACKARD MOTOR CAR COMPANY, OF DETROIT, MICHIGAN, A CORPORATION OF MICHIGAN

MOTOR VEHICLE

Application filed October 28, 1925. Serial No. 65,269.

This invention relates to motor vehicles and particularly to the transmission gearing thereof and the means for shifting the gearing.

In sliding gear transmissions such as are used to-day, the sliding gear elements are usually held in their gear positions by friction stops or similar devices. These stops are usually sufficient to hold the gears in mesh when the gears are new, but it is found that if the gears are used very much and become worn the friction stop is not sufficient thereafter to retain the gears in mesh, and in some cases the operator has to hold the gears in mesh by means of the gear shift lever.

One of the objects of the present invention is to provide means for positively locking a sliding gear in its geared position so that it cannot slide or jump out when in use.

Another object of the invention is to provide a positive lock for the sliding gear, which lock may be easily released by the operator in shifting the gears to another position.

Other objects of the invention will appear from the following description taken in connection with the drawings, which form a part of this specification, and in which:

Fig. 1 is a side elevation in part section of a motor vehicle transmission gearing embodying the invention;

Fig. 4 is a view similar to Fig. 3 illustrating a modified form of the spring device.

Figure 2:
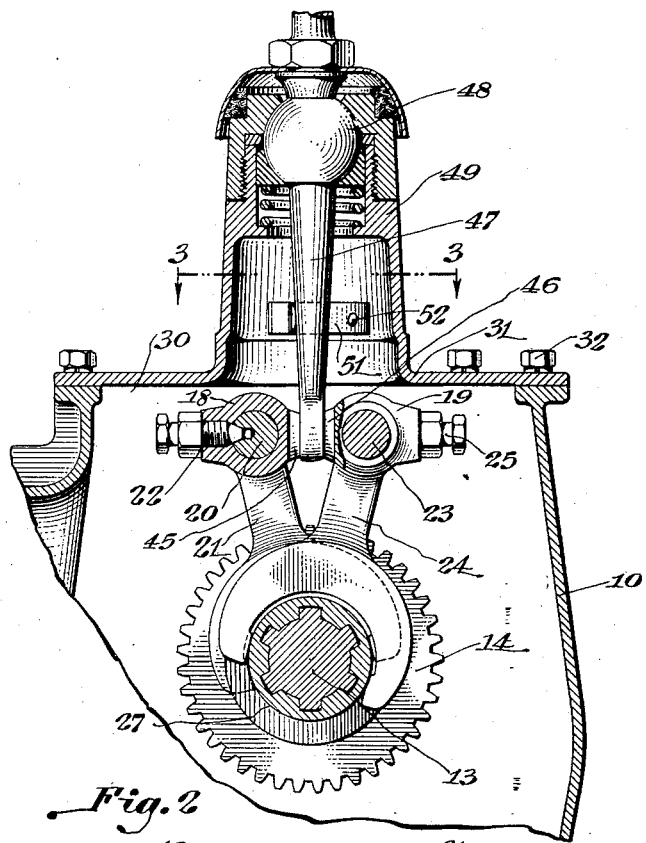
Fig. 2 is a transverse section substantially on the line 2—2 of Fig. 1.

Referring to the drawings, 10 represents the transmission or gear case of a motor vehicle and 11 is the main driving gear mounted within the casing. A driven shaft 12 extends from the opposite end of the casing and a part of this shaft may be seen at 13 as extending through the casing and having its forward end mounted in a spigot bearing in the gear 11. There are two sliding gear elements 14 and 15 mounted on the shaft 12, 13, this shaft being splined as shown so that the gears and shaft will turn together. Gears 16 and 17 within the casing are mounted on a countershaft, the gear 16 constantly meshing with the gear 11 and the gear 17 being adapted to mesh with the gear 14 when the latter is shifted rearwardly to what is known as second speed position. The gear 14 is also formed with internal teeth which are adapted to mesh with the gear 11 to form a clutched engagement therewith and produce a direct drive. The gear 15 is adapted to be shifted both ways from its neutral position to engage with either the low speed gear or the reverse gear. Gears 14 and 15 are shown in Fig. 1 in their neutral positions.

Gear shifter elements are provided for moving the gears 14 and 15 from their neutral to gear or meshing positions. These elements are indicated at 18 and 19. They are mounted in the upper part of the casing 10 above the shaft 13, and the element 18 is formed by a rod 20 having a shifter fork 21 secured thereto as by a bolt 22 shown particularly in Fig. 2. The shifter element 19 is formed by a rod 23 and a shifter fork 24 secured thereto by a bolt 25. The fork 21 extends into a groove 26 formed in the gear element 14 and the fork 24 extends into a groove 27 formed in the gear element 15, so that as these forks are moved longitudinally of the shaft 13 the gears are shifted on the shaft from their neutral position to any one of the various gear positions.

The rods 20 and 23 are mounted in suitable bearing parts 28 and 29 of the gear casing 10 and they are accessible through an opening 30 formed in the upper part of the casing. This opening is closed by a cover 31 detachably secured thereto as by bolts 32, and the cover forms a support for the gear shift lever hereinafter referred to. The ends of the rods 20 and 23 extend through the rear end of the casing 10 and these projecting ends are protected by a supplemental casing 33 secured to the casing as by bolts 34.

The rod 20 is formed with a neutral notch 35, a second speed notch 36 and a third or high speed notch 37, the notches 36 and 37 being for the gear positions of the rod. A spring pressed plunger 38 is adapted to cooperate with the notches 35, 36 and 37 to yieldingly or frictionally retain the rod 20 in its various positions. The rod 23 is formed with a neutral notch 39, a first speed notch 40, and a reverse speed notch 41, and a spring pressed plunger 42 is provided to co-operate with these notches to retain the rod in its adjusted position.

The rods 20 and 23 also have interlocking notches 43 with which a pin 44 co-operates. This pin 44 is of such length that when one of the rods is moved so that the pin is thereby pushed out of its notch 43, the pin will enter the notch 43 of the other rod and thereby lock the latter positively against endwise movement. Thus, only one of the rods 20, 23 can be shifted from neutral position at one time, or in other words, when one of the rods is shifted from neutral position, the other is locked in that position.

The shifter element 18 is provided with a notch 45 and the shifter element 19 is provided with a notch 46, which notches are adjacent or opposite each other when the elements are in their neutral position as shown for instance in Fig. 1. These notches are adapted to receive the end of a shift lever 47, which is suitably mounted for universal movement as in the ball mounting 48 in an upward extension 49 of the cover 31 above described. This mounting of the shift lever 47 permits of the lever being moved laterally relative to the shifter elements 18 and 19 and to be moved longitudinally of those elements. The lower end of the lever 47 where it extends into the notches 45 and 46 is substantially as wide as one of those notches so that when it is in a notch it may move with the element and clear the other element. Thus, the lower end of the lever 47 may be moved laterally into the notch 45 and the element 18 may then be shifted lengthwise of its rod 20 and this will carry with it the fork 21 and consequently the gear element 14. Or, when the shifter elements are in neutral positions, the lower end of the lever 47 may be moved into the notch 46 and the element 19 may then be shifted and this will carry with it the fork 24 and the gear element 15. When either of these shifting movements is made, the other shifter element will be locked in neutral position by the interlocking pin 44 as above described.

Figure 3:
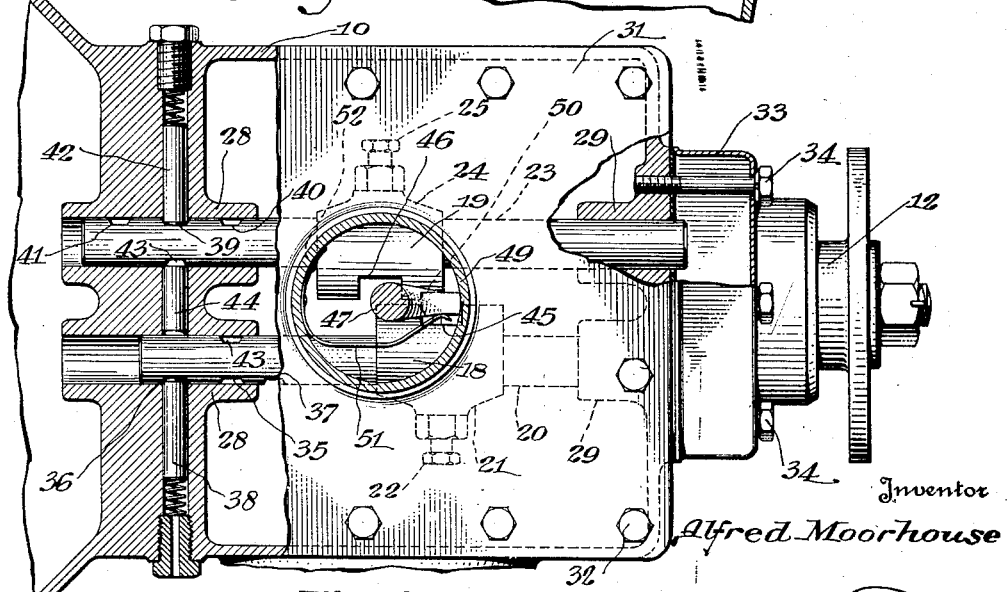
Fig. 3 is a plan view and part section, the section being approximately on the line 3—3 of Fig. 1 and on the line 3—3 of Fig. 2.

The shifter element 19 is also formed with a shallow notch 50 which is so positioned that it is opposite the notch 45 of element 18 when the latter is in one of its gear positions. As shown in Fig. 3, the element 18 is in second speed position and this is when the gears 14 and 17 are in mesh. With the elements 18 and 19 in the position shown in Fig. 3, the lever 47 may be moved laterally into the shallow notch 50 and part of the lever will still remain in the notch 45 of the element 18 so that neither shifter element 18, 19 can then be moved longitudinally. In other words, with the end of the lever 47 partly in notch 50 and partly in notch 45, the two shifter elements are interlocked because the interlocking pin 44 positively retains the element 19 against movement, and the end of the lever 47 prevents movement of the element 18 relative to the element 19.

For yieldingly pressing and retaining the lever 47 into the notch 50, as shown in Fig. 3, a spring device 51 is provided. In Fig. 3 this device 51 is shown in the form of a plate spring secured as by rivets 52 to the part 49 of the cover 31, and this spring is so formed that it contacts with the lower end of the lever 47 only when said lever is moved with the element 18 into second speed position. As the element 18 reaches second speed position, the spring 51 contacts with the lower end of the rod 47 and pushes it into the notch 50 and yieldingly retains it there. The operator then, instead of pulling the lever directly back into neutral position, first moves it laterally slightly until its lower end is disengaged from the notch 50, and then the lever 47 may be moved to neutral position, carrying with it the shifter element 18. As long as the operator does not move the lever 47, it will constitute an interlock between the shifter elements 18 and 19 and positively retain the gear 14 in mesh with gear 17. The spring 51 does not interfere with the movement of the shift lever in any of its other positions so that except for the slight lateral movement that the operator must give the shift lever in shifting from second position, there is no modification of the conventional shift lever.

In Fig. 4 a modification of the spring device is illustrated. In this construction a coil spring 61 is connected to the shift lever 47 as at 62 and to the part 49 of the cover 31 at 63 so that there is a tendency to draw the lower end of the lever 47 to the notch 50 when the lever is moved to second speed position. The connection of this spring is such that it does not tend to move the lever laterally when it is in its other gear positions or in neutral positions.

It will be understood that various forms of the invention other than those described above may be used without departing from the spirit or scope of the invention.

Having thus described my invention, what I claim and desire to secure by Letters Patent is:

1. In a transmission gearing, the combination of two gear elements to be shifted, a shifter element for each of said gear elements, an interlocking member between the shifting elements, a shift lever for moving said shifter elements one at a time from neutral to a gear position, and means engaging the shifting lever to interlock the shifter elements when one of the shifter elements is in a gear position.

2. In a transmission gearing, the combination of two shifter elements, a lever for shifting one of said elements at a time from neutral to gear position, and means operating in connection with said shift lever whereby one of said shifter elements co-acts with the other to lock the latter in its gear position.

3. In a transmission gearing, the combination of two shifter elements, a lever means between said elements for locking one in neutral position when the other is shifted to gear position, and means co-operating with the lever to interlock the shifted elements.

4. In a transmission gearing, the combination of shifter elements, a lever for operating the shifter elements and means cooperating with the lever for interlocking one of said elements when in gear position with the other one of said elements when in neutral position.

5. In a transmission gearing, the combination of shifter elements, a shift lever adapted to be moved into engagement with and to shift either of said shifter elements, and means for causing an interlocking action of said shift lever between said shifter elements.

6. In a transmission gearing, the combination of shifter elements, a lever adapted to engage with and move either of said elements from neutral to gear position, and yielding means for pressing said lever into interlocking engagement between a shifter element in neutral position and a shifter element in gear position.

7. In a transmission gearing, the combination of shifter elements, a shifting lever for operating the shifter elements, means for interlocking the elements so that one of them is positively retained in neutral position when the other is shifted therefrom, and means co-operating with the lever causing an interlocking of said elements when one of them is in gear position.

8. In a transmission gearing, the combination of shifter elements, a shift lever therefor, means related to said lever for interlocking said elements thereby in one of its gear positions, a support for the lever, and means in said support for yieldingly retaining said lever in said one of its positions of interlocking said elements.

9. In a transmission gearing, the combination of shifter elements, a shift lever for moving said elements to various positions, means coordinated with said lever for interlocking said elements thereby in one of its gear positions, and means carried by a support for the lever for yieldingly retaining it when and only in said one of its positions with the shifter elements interlocked.

10. In a transmission gearing, the combination with shifter elements having notches that are adjacent when the elements are in neutral position, one of said elements having a notch so formed that it is adjacent the notch of the other element when the latter is in shifted position, and a shifter lever co-operating with said notches.

11. In a transmission gearing, the combination with shifter elements having notches that are adjacent when the elements are in neutral position, one of said elements having a notch so formed that it is adjacent the notch of the other element when the latter is in shifted position, and a shift lever co-operating with said notches so that the lever may shift either of said elements from neutral to gear position and so that it may form an interlock between said elements when the element having the single notch is in its gear position.

12. In a transmission gearing, the combination of two shifter elements, a shift lever adapted to be moved laterally to engage either of said elements and to be moved longitudinally to move the engaged element, and means for moving the shift lever laterally to interlock the shifter elements when one of them is in neutral and the other is in shifted position.

In testimony whereof I affix my signature.

ALFRED MOORHOUSE.